No. 689,744. Patented Dec. 24, 1901.
T. A. PERRY & A. F. HART.
CORN HARVESTER.
(Application filed May 18, 1900.)
(No Model.)
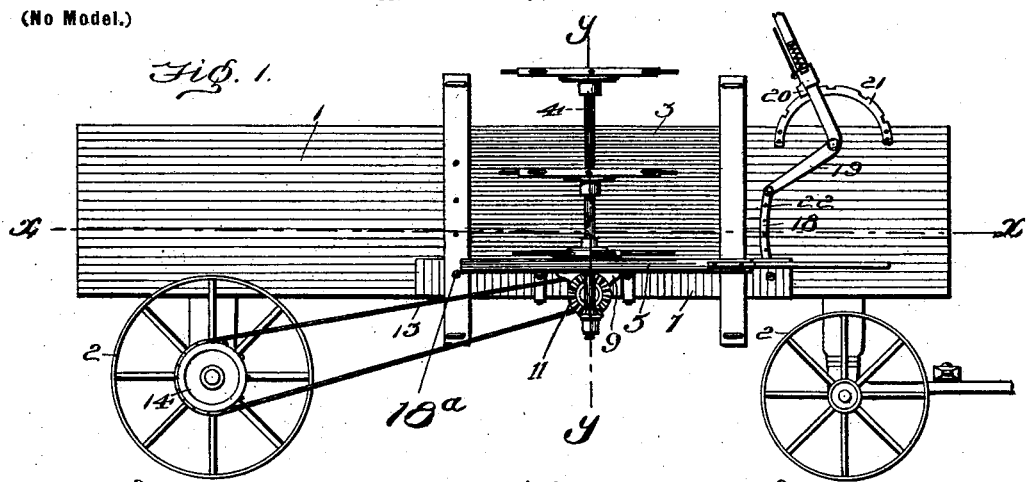
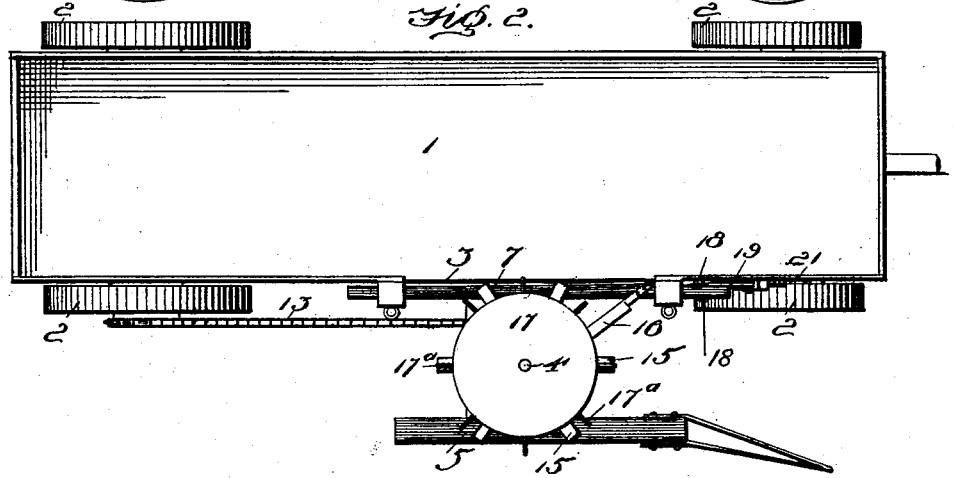
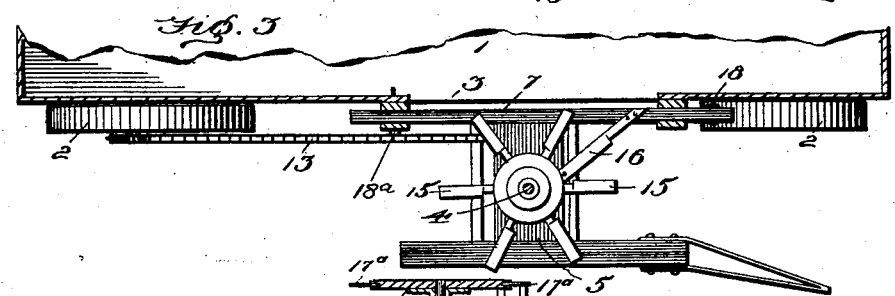
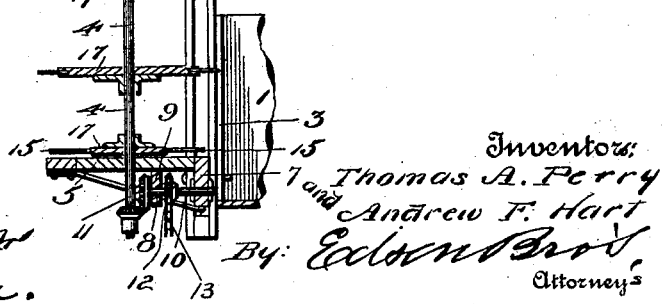
Witnesses
Edwin B. H. Tower, Jr.
W. Perry Hahn.
Inventors:
Thomas A. Perry
and Andrew F. Hart
By Edson Bro's
Attorneys
THE NORRIS PETERS CO., PHOTO-LITHO., WASHINGTON, D. C.

UNITED STATES PATENT OFFICE.

THOMAS A. PERRY, OF NEW CHILLICOTHE, KANSAS, AND ANDREW F. HART, OF PAYETTE, IDAHO.

CORN-HARVESTER.

SPECIFICATION forming part of Letters Patent No. 689,744, dated December 24, 1901.

Application filed May 18, 1900. Serial No. 17,123. (No model.)

*To all whom it may concern:*

Be it known that we, THOMAS A. PERRY, residing at New Chillicothe, in the county of Dickinson and State of Kansas, and ANDREW F. HART, residing at Payette, in the county of Canyon and State of Idaho, citizens of the United States, have invented certain new and useful Improvements in Corn-Harvesters; and we do hereby declare the following to be a full, clear, and exact description of the invention, such as will enable others skilled in the art to which it appertains to make and use the same.

Our invention relates to certain improvements in corn-harvesters.

It has for its object to provide for the ready harvesting or severing of the stalk and the delivering of the severed stalks into the box or body mounted upon the running-gear of the harvester and to expedite and facilitate the adjustment of the harvesting mechanism according to the height of the stalks to be operated upon or severed. It also provides for simplifying construction, lessening cost of manufacture, and promoting the utility of the machine.

It consists of the combination and arrangement of parts, substantially as hereinafter more fully disclosed, and specifically pointed out by the claims.

In the accompanying drawings, illustrating the preferred embodiment of our invention, Figure 1 is a side view. Fig. 2 is a plan view. Fig. 3 is a horizontal section taken on the line $x$ $x$ of Fig. 1, and Fig. 4 is a vertical section taken on the line $y$ $y$ of Fig. 1.

Latitude is allowed herein as to details, as they may be changed or varied at will without departing from the spirit of our invention and said invention yet remain intact and be protected.

In carrying out our invention we employ a suitable wagon body or box 1, mounted upon suitable running-gear 2, and provide said body or box with an opening 3 in its side near the forward end. Upon the outside of said box or body 1, directly opposite and contiguously to the opening 3 in its side, is arranged a vertical rotary shaft 4, passing through and upheld in a framework or platform 5, secured to a pivoted timber or beam 7, presently again referred to. Secured to the under side of the framework or platform 5 is a bracket 9, carrying a bearing 8, through which passes a short shaft or axle 10, which is journaled in said bearing and also in the beam or timber 7. The shaft 4 has its lower end suitably geared to and is driven by a gearing or cogwheel 11, secured to said shaft 10, also having fixed thereto a sprocket-wheel 12, preferably driven by a chain belt 13, engaging a second sprocket-wheel 14, receiving motion from one of the running-gear wheels. Said shaft 4 has fixed to it near the platform 5 a number of radial or outstanding knives or blades 15, and arranged obliquely or diagonally to the line of draft of the machine is a knife or blade 16, adapted to coact with the aforesaid blades or knives as they are carried or rotated past it to effect a cutting action or operate upon whatever may be interposed between them—as, for instance, the stalks, with the corn thereon—as the machine is being propelled forward. The knife or blade 16 is secured at its ends to the platform or frame 5 and the beam or timber 7, respectively. The shaft 4 has also secured to it, preferably, two disks 17, armed with peripheral pins or projections $17^a$ to strike and deflect the stalks with the corn thereon into the body or box 1, through its lateral opening 3, as the stalks are severed by the knives. These disks are so disposed as to insure the passing or delivering of the cut corn into the box or body and arranged at different altitudes to operate upon or engage corn or stalks of different heights or provide for acting upon stalks of a certain height at two different points or near where cut by the knives and still further up at the same time, and thus supplement the action of one disk by the action of a second disk for more effectively delivering or passing the cut corn into the box or body.

The beam or timber 7 is fulcrumed upon a bolt $18^a$, preferably between uprights suitably bolted or connected together and to the side of the body or box, and has connected to it, near its forward end, at one side a link 18. This link is connected to the lower angular arm of a bell-crank lever 19, suitably pivoted to the box or body and having a spring-pressed detent or pawl 20, adapted to engage a notched quadrant or rack 21 upon said body or box to readily hold said lever at the required point of adjustment.

The link 18 has a series of adjusting holes or apertures 22 in it to provide for varying the point of connection between it and the lever or beam 7, according to the required adjustment of the height of the forward end of said beam, and consequently that of the knives, as the necessities of the case may require.

Having thus fully described our invention, what we claim, and desire to secure by Letters Patent, is—

1. In a corn-harvester, the combination of a body or box having a lateral opening, a suitably geared and driven shaft arranged contiguously to said opening carrying radial knives or blades and a reel-disk, an oblique stationary knife or blade, and means for carrying said stationary knife, substantially as specified.

2. In a corn-harvester, the combination of a body or box having a lateral opening, a suitably geared and driven shaft arranged contiguously to said opening carrying radial knives and above said knives a plurality of reel-disks, an oblique stationary knife, and means for carrying said stationary knife, substantially as specified.

3. In a corn-harvester, the combination of a body or box having a lateral opening, a suitably geared and driven shaft arranged contiguously to said opening carrying radial knives and reel-disks provided with peripheral pins or projections, an oblique stationary knife, and means for carrying said stationary knife, substantially as specified.

4. In a corn-harvester, the combination of the body or box having a lateral opening, a suitably geared and driven shaft arranged opposite and contiguously to said opening and carrying radial knives and reel-disks, an oblique stationary knife, substantially as set forth.

5. In a corn-harvester, the combination of a body or box having a lateral opening, a suitably geared and driven shaft arranged opposite and contiguously to said lateral opening and carrying radial knives and reel-disks, a platform or framework supported from said body or box and adapted to permit the passing therethrough of said shaft, an oblique stationary knife, means for supporting said stationary knife, substantially as set forth.

In testimony whereof we affix our signatures in presence of witnesses.

THOMAS A. PERRY.
ANDREW F. HART.

Witnesses as to Thomas A. Perry:
J. C. RUSSEL,
M. FENSTERMACHER.
Witnesses as to Andrew F. Hart:
F. M. SATORIS,
EDWIN W. TRACY.